Oct. 22, 1957 W. J. MORRILL 2,810,844
GEARING ARRANGEMENT FOR DYNAMOELECTRIC MACHINES
Filed June 22, 1954

INVENTOR.
WAYNE J. MORRILL

United States Patent Office 2,810,844
Patented Oct. 22, 1957

2,810,844

GEARING ARRANGEMENT FOR DYNAMO-
ELECTRIC MACHINES

Wayne J. Morrill, Garrett, Ind.

Application June 22, 1954, Serial No. 438,411

5 Claims. (Cl. 310—83)

The invention relates in general to dynamoelectric machines and more particularly to means to produce a selected frequency.

In a dynamoelectric machine one of the principal parts may be classified as a rotor or an armature and the other principal part may be classified as a stator or a field winding.

In this application, the term rotor element will include a rotor or an armature and the term stator element will include a stator of a field winding.

An object of my invention is to provide, in a dynamoelectric machine which produces a base generating frequency depending upon the relative speeds between the two principal elements of the machine, for modifying the relative speed between one of said elements and the shaft to produce a modified selected frequency different from the base frequency.

Another object of my invention is to provide, in a dynamoelectric machine which produces a base generating frequency depending upon the relative speeds between the rotor element and the stator element of the machine, for modifying the relative speed between said rotor element and the shaft to produce a modified selected frequency different from the base frequency.

Another object of my invention is to provide a gearing arrangement whereby a rotor element of a dynamoelectric machine is driven at a speed relative to that of the driving member.

Another object of my invention is to provide a planetary gear arrangement whereby the rotor element of a generator may be rotated with respect to a main constant speed driving shaft to produce a desired frequency or a desired phase relationship in a polyphase power system.

A still further object of my invention is to provide a generator or alternator speed different from the speed of a driving means while retaining the mechanical advantages and neat overall appearance of a two bearing motor generator set.

Figure 1:
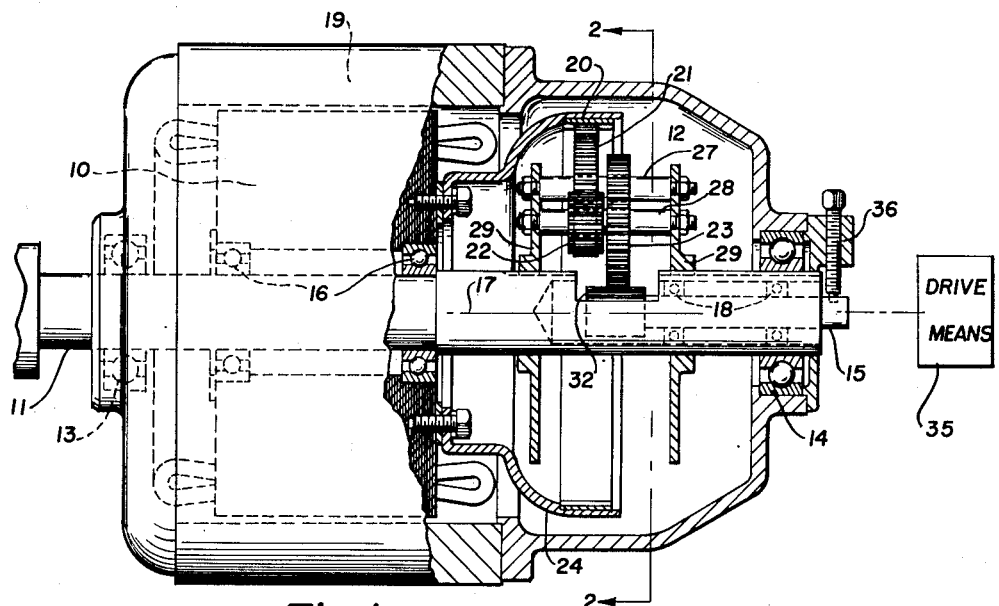
Figure 2:
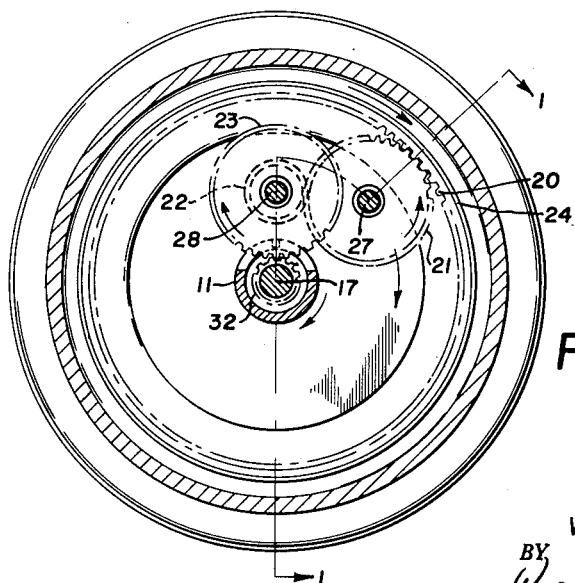

Other objects and a fuller understanding of this invention may be had by referring to the following description and claims, taken in conjunction with the accompanying drawings, in which:

Figure 1 is a diagrammatic illustration incorporating my invention, the cut away section being taken along the lines 1—1 in Figure 2; and Figure 2 is an end view of my invention taken generally along the lines 2—2 of Figure 1.

With reference to Figures 1 and 2, my invention includes generally a rotor element 10, a main drive shaft 11 and a planetary gear system indicated generally by the reference numeral 12. The drive shaft 11 is mounted upon suitabe bearings 13 and 14 and is suitably tapped at one end to receive a stub shaft or planetary control shaft 15 which is journalled in said shaft and is mounted upon suitable bearings 18. This common axis will be designated by a reference numeral 17 and will be shown by a point in Figure 2. A stator element is indicated generally at 19. The rotor element 10 is mounted upon the shaft 11 upon suitable bearings 16 for rotation with respect to said shaft. The planetary gear system indicated generally at 12 incluudes a ring gear 20 and planet gear means including first, second, and third planet gears indicated generally by the reference numerals 21, 22, and 23 respectively. The ring gear 20 is fixedly attached to the rotor element 10, for rotation therewith, by suitable means and as illustrated in the accompanying figures by the member 24. The planet gear 21 is mounted for rotation about its own axis upon a suitable shaft or support bearing means indicated by the reference numeral 27. The planet gears 22 and 23 are fixed together as a unit and are rotatable about their common axes by means of a suitable shaft or support bearing means 28. The shafts 27 and 28 are mounted or attached to a support member 29, which support member is fixedly attached to the shaft 11 for rotation therewith. The gear 21 is mounted for engagement with the ring gear 20 at one portion and engagement with the planet gear 22 at another portion. The point 17 will also be designated as the center of the planetary gear system 12.

A sum or pinion gear 32 is mounted upon the stub shaft 15 and is located to engage the planet gear 23. Drive means 35 are adapted to engage the stub shaft 15 to rotate the stub shaft in either a clockwise or counterclockwise direction and holding means indicated by the pin 36 are adapted to extend into a portion of the stub shaft 15 to maintain the stub shaft from axial movement and also to maintain the stub shaft from rotational movement.

In the normal dynamoelectric machine, the relative rotation of the rotor element and the stator element produces a base frequency. In my invention provision is made to modify this rotation to produce a selected frequency different from the base frequency. In the case of a standard fourteen pole dynamoelectric machine driven at 3600 R. P. M., the base frequency delivered would be approximately four hundred twenty cycles. With the provision of my invention as illustrated in the following example, this base frequency is modified to approximately four hundred cycles.

For the illustration of the operation of my invention, a numerical value will be assigned to the speed of rotation of said drive shaft 11 and numerical values will be assigned to the actual numbers of teeth upon each gear of the planetary gear system 12. For the sake of example, a speed of 3,600 R. P. M. will be assigned to the main drive shaft 11 and in a clockwise direction as viewed in Figure 2. The sun gear 32 is assigned nine teeth, the planet gears 22 and 23 are assigned eight and thirty-six teeth respectively. The number of teeth assigned to planetary gear 21 is immaterial and the ring gear will be assigned a value of forty-two teeth. When the sun gear 32 is maintained in a fixed position by means of the pin 36, the shaft 11, by way of the support member 29, will tend to rotate the axis of the gear 21 and the common axes of gears 22 and 23 in a clockwise direction about the center 17 of the planetary gear system 12. This rotation will cause the gear 23 and hence the gear 22 to rotate about their common axes in a clockwise direction. The engagement of the gear 22 with the gear 21 will cause gear 21 to move in a counterclockwise direction about its axis. The engagement of gear 21 with the ring gear 20 will cause the ring gear to rotate about the center of the planetary gear system at a lessor speed than the shaft 11 or the axes of the planetary gears 21, 22, and 23. Since the ring gear 20 is fixedly attached to the rotor 10 for rotation therewith, it will be plainly seen that this will cause the rotor to rotate at the same speed as the ring gear at a speed relative to the speed of the main shaft 11, or in this case at a lesser speed than the main shaft 11. In this case, taking into consideration the arbitrary values that we have assigned to the respective gears of the planetary gear system, when the main shaft 11 is rotating at 3,600 R. P. M. in a clockwise direction, the ring gear will be rotating in a clockwise direction also, but at a speed of approximately 3,428 R. P. M. This speed in the case of our fourteen pole machine would produce the four hundred cycle power. The directional arrows upon Figure 2 are designed to illustrate the direction of movement of the planetary gear system in the above-mentioned example. It should be kept in mind that the values assigned to the respective gears of the planetary gear system are only arbitrary and are used only for the purpose of explanation.

If the stub shaft 15 were driven in a clockwise direction, it would produce an increase in the clockwise speed of the ring gear 20 in a ratio that would be proportional to the clockwise speed of the stub shaft 15. If the stub shaft 15 were rotated in a counterclockwise direction, there would be a decrease in the clockwise speed of rotation of the ring gear 20 that would be proportional to the counterclockwise speed of rotation of the stub shaft 15. By increase or decrease is meant an increase or decrease above or below 3,428 R. P. M. produced when the sun or pinion gear is held stationary for this particular example.

As has been illustrated in the method of operation, it will be readily apparent that by maintaining the stud shaft 15 having the sun gear 32 in a fixed or non-rotational condition or by rotating the stub shaft 15 in either a clockwise or counterclockwise direction, and utilizing the gear ratios as illustrated or other gear ratios, practically any desired speed of rotation may be acquired for the ring gear 20.

This may be used to obtain the desired frequency from a generator having a constant speed driving source or may be utilized to vary the phase relationship of a polyphase power system.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a dynamoelectric machine the combination of a drive shaft having an end portion and having an axis of rotation, a rotor element journalled upon said drive shaft for relative rotation thereabout with respect to said drive shaft, a stator element fixedly mounted and surrounding said rotor element, a bore extending coaxially within said end portion of said drive shaft, a slot extending through said drive shaft into said bore, a stub shaft journalled within said bore and adapted to rotate with respect to said drive shaft about said axis of rotation, said stub shaft having a first and a second end portion, said first end portion of said stub shaft having a sun gear connected thereto which sun gear is in register with said slot, holding means in a first position cooperating with said stub shaft to maintain said stub shaft from rotation and said holding means in a second position permitting rotation of said stub shaft, drive means cooperating with said second end portion of said stub shaft for rotating said stub shaft relative to said drive shaft, a first and a second support member fixedly attached to said drive shaft on either side of said slot and extending in a generally radial direction from said axis of rotation, a first and a second support bearing means each extending between said first and second support member respectively, a first planet gear mounted on said first support bearing means and second and third planet gears mounted on said second support bearing means, a ring gear fixedly attached to said rotor for movement therewith, said first planet gear engaging said ring gear at a portion thereof and engaging said second planet gear at another portion thereof, said third planet gear rotatable with said second planet gear and extending into said slot for engagement with said sun gear, whereby said rotor is rotated about said drive shaft at a first rotational speed by said drive shaft which is traveling at a second rotational speed which is greater than said first rotational speed and in a rotational direction which is the same as the rotational direction of said rotor when said stub shaft is maintained from rotation.

2. In a dynamoelectric machine the combination of a drive shaft having an end portion and having an axis of rotation, a rotor element journalled upon said drive shaft for relative rotation thereabout with respect to said drive shaft, a stator element surrounding said rotor element, a bore extending coaxially within said end portion of said drive shaft, said drive shaft having an opening communicating with said bore, a stub shaft journalled within said bore, said stub shaft having a first and a second end portion, said first end portion of said stub shaft having a sun gear connected thereto, means cooperating with said stub shaft to maintain said stub shaft from rotation, a support member fixedly attached to said drive shaft adjacent said opening and extending in a direction which is substantially perpendicular to said axis of rotation, a first and a second support bearing means carried by said support member, first planet gear means mounted on said first support bearing means and second planet gear means mounted on said second support bearing means, a ring gear fixedly attached to said rotor for movement therewith, said first planet gear means engaging said ring gear at a portion thereof and engaging said second planet gear means at another portion thereof, said second planet gear means extending through said opening for engagement with said sun gear.

3. In a dynamoelectric machine the combination of a drive shaft having an end portion and having an axis of rotation, a rotor element journalled upon said drive shaft for relative rotation thereabout with respect to said drive shaft, a bore extending coaxially within said end portion of said drive shaft, a slot extending through said drive shaft into said bore, a stub shaft extending within said bore coaxially with said drive shaft, said stub shaft having a first and a second end portion, said first end portion of said stub shaft having a sun gear connected thereto, means cooperating with said stub shaft in a first position to maintain said stub shaft from rotation a support member fixedly attached to said drive shaft and extending in a direction which is substantially radial to said axis of rotation, a first and a second support bearing means carried by said support member, a first planet gear mounted on said first support bearing means and second and third planet gears mounted on said second support bearing means, a ring gear fixedly attached to said rotor for movement therewith, said first planet gear engaging said ring gear at a portion thereof and engaging said second planet gear at another portion therof, said third planet gear rotatable with said second planet gear and extending through said slot for engagement with said sun gear.

4. In a dynamoelectric machine the combination of a drive shaft having an axis of rotation, a rotor element journalled upon said drive shaft for relative rotational movement with respect thereto, a bore extending coaxially within a portion of said drive shaft, wall means defining an opening communicating with said bore, a planetary control shaft extending within said bore coaxial with said drive shaft, a sun gear secured to a portion of said planetary control shaft, means for controlling said planetary control shaft, a support member carried by said drive shaft and extending in a direction generally transverse to said axis of rotation, support bearing means carried by said support member, planet gear means mounted by said support bearing means, a ring gear connected to said rotor, said planet gear means engaging said ring gear at a portion thereof and extending through said opening and engaging said sun gear at another portion thereof.

5. In a dynamoelectric machine the combination of a drive shaft having an axis of rotation, a rotor element journalled upon said drive shaft for relative rotational movement with respect thereto, a bore extending coaxially within a portion of said drive shaft, wall means defining an opening communicating with said bore, a planetary control shaft extending within said bore coaxial with said drive shaft, a planetary gearing system including a support member, a sun gear, planet gear means and a ring gear, said sun gear secured to a portion of said planetary control shaft, means for controlling said planetary control shaft, said support member carried by said drive shaft and extending in a direction generally transverse to said axis of rotation, support bearing means carried by said support member, said planet gear means mounted by said support bearing means, said planet gear means engaging said ring gear at a portion thereof and extending through said opening and engaging said sun gear at another portion thereof, and means connecting the output of said planetary gearing system to said rotor.

References Cited in the file of this patent

UNITED STATES PATENTS

| | | |
|---|---|---|
| 1,828,944 | Rossman | Oct. 27, 1931 |
| 1,870,076 | Thomson | Aug. 2, 1932 |
| 2,087,261 | Miller | July 20, 1937 |
| 2,316,122 | Nardone | Apr. 6, 1943 |
| 2,362,998 | Harshberger | Nov. 21, 1944 |
| 2,422,933 | Small | June 24, 1947 |
| 2,436,936 | Page | Mar. 2, 1948 |
| 2,487,328 | George et al. | Nov. 8, 1949 |
| 2,597,357 | McCormick | May 20, 1952 |

FOREIGN PATENTS

| | | |
|---|---|---|
| 815,064 | Germany | Sept. 27, 1951 |